US006592952B1

(12) United States Patent
Ferguson

(10) Patent No.: US 6,592,952 B1
(45) Date of Patent: Jul. 15, 2003

(54) DECORATIVE HOLIDAY ORNAMENT

(76) Inventor: Russell C. Ferguson, P.O. Box 392, Mammoth Lakes, CA (US) 93546

( * ) Notice: Subject to any disclaimer, the term of this patent is extended or adjusted under 35 U.S.C. 154(b) by 41 days.

(21) Appl. No.: 09/887,236

(22) Filed: Jun. 22, 2001

(51) Int. Cl.⁷ .............................................. A47G 33/04
(52) U.S. Cl. ............................. 428/10; 428/7; 428/18; 428/99; 362/157; 40/546; 40/547
(58) Field of Search ............................. 428/10, 7, 18, 428/99; 362/122, 157, 806; D11/120; 40/599, 611, 547, 551, 546

(56) References Cited

U.S. PATENT DOCUMENTS

| | | |
|---|---|---|
| D206,124 S | 11/1966 | Burnbaum |
| 4,924,612 A | 5/1990 | Kopelman |
| 5,315,492 A | 5/1994 | Davenport |
| 5,558,422 A | 9/1996 | Sanford |
| 5,639,521 A | 6/1997 | Fraus et al. |
| 5,789,043 A | 8/1998 | Law et al. |
| 5,814,379 A * | 9/1998 | Roccaforte ...................... 428/5 |
| 6,093,459 A * | 7/2000 | Puleo, Jr. ...................... 428/20 |
| 6,386,746 B1 * | 5/2002 | Kao ........................... 362/567 |

* cited by examiner

*Primary Examiner*—Deborah Jones
*Assistant Examiner*—Abraham Bahta

(57) ABSTRACT

A decorative holiday ornament for displaying easily-moved lighted holiday greetings. The decorative holiday ornament includes a wreath being adapted to be mounted upon a structure; and also includes a protective backing member being securely attached to a back of the wreath to prevent the wreath from scratching the structure; and further includes a light-emitting assembly being attached to the wreath and including fiber optics being arranged to form lines, letters and words and being displayed upon a front of the wreath.

7 Claims, 2 Drawing Sheets

DECORATIVE HOLIDAY ORNAMENT

BACKGROUND OF THE INVENTION

1. Field of the Invention

The present invention relates to structure-mounted holiday ornaments and more particularly pertains to a new decorative holiday ornaments for displaying easily-moved lighted holiday greetings.

2. Description of the Prior Art

The use of structure-mounted holiday ornaments is known in the prior art. More specifically, structure-mounted holiday ornaments heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,558,422; U.S. Pat. No. 5,789,043; U.S. Pat. No. 4,924,612; U.S. Pat. No. 5,639,521; U.S. Pat. No. 5,315,492; U.S. Pat. No. Des. 206,124; and U.S. Pat. No. Des. 135,213.

While these devices fulfill their respective, particular objectives and requirements, the aforementioned patents do not disclose a new decorative holiday ornament. The inventive device includes a wreath being adapted to be mounted upon a structure; and also includes a protective backing member being securely attached to a back of the wreath to prevent the wreath from scratching the structure; and further includes a light-emitting assembly being attached to the wreath and including fiber optics being arranged to form lines, letters and words and being displayed upon a front of the wreath.

In these respects, the decorative holiday ornament according to the present invention substantially departs from the conventional concepts and designs of the prior art, and in so doing provides an apparatus primarily developed for the purpose of displaying easily-moved lighted holiday greetings.

SUMMARY OF THE INVENTION

In view of the foregoing disadvantages inherent in the known types of structure-mounted holiday ornaments now present in the prior art, the present invention provides a new decorative holiday ornament construction wherein the same can be utilized for displaying easily-moved lighted holiday greetings.

the general purpose of the present invention, which will be described subsequently in greater detail, is to provide a new decorative holiday ornament which has many of the advantages of the structure-mounted holiday ornaments mentioned heretofore and many novel features that result in a new decorative holiday ornament which is not anticipated, rendered obvious, suggested, or even implied by any of the prior art structure-mounted holiday ornaments, either alone or in any combination thereof.

To attain this, the present invention generally comprises a wreath being adapted to be mounted upon a structure; and also includes a protective backing member being securely attached to a back of the wreath to prevent the wreath from scratching the structure; and further includes a light-emitting assembly being attached to the wreath and including fiber optics being arranged to form lines, letters and words and being displayed upon a front of the wreath.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new decorative holiday ornament which has many of the advantages of the structure-mounted holiday ornaments mentioned heretofore and many novel features that result in a new decorative holiday ornament which is not anticipated, rendered obvious, suggested, or even implied by any of the prior art structure-mounted holiday ornaments, either alone or in any combination thereof.

It is another object of the present invention to provide a new decorative holiday ornament which may be easily and efficiently manufactured and marketed.

It is a further object of the present invention to provide a new decorative holiday ornament which is of a durable and reliable construction.

An even further object of the present invention is to provide a new decorative holiday ornament which is susceptible of a low cost of manufacture with regard to both materials and labor, and which accordingly is then susceptible of low prices of sale to the consuming public, thereby making such decorative holiday ornament economically available to the buying public.

Still yet another object of the present invention is to provide a new decorative holiday ornament which provides in the apparatuses and methods of the prior art some of the advantages thereof, while simultaneously overcoming some of the disadvantages normally associated therewith.

Still another object of the present invention is to provide a new decorative holiday ornament for displaying easily-moved lighted holiday greetings.

Yet another object of the present invention is to provide a new decorative holiday ornament which includes a wreath being adapted to be mounted upon a structure; and also includes a protective backing member being securely attached to a back of the wreath to prevent the wreath from scratching the structure; and further includes a light-emitting assembly being attached to the wreath and including fiber optics being arranged to form lines, letters and words and being displayed upon a front of the wreath.

Still yet another object of the present invention is to provide a new decorative holiday ornament that is easy and convenient to use.

Even still another object of the present invention is to provide a new decorative holiday ornament that would add to the decor of a building or even to a vehicle during the holiday season.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
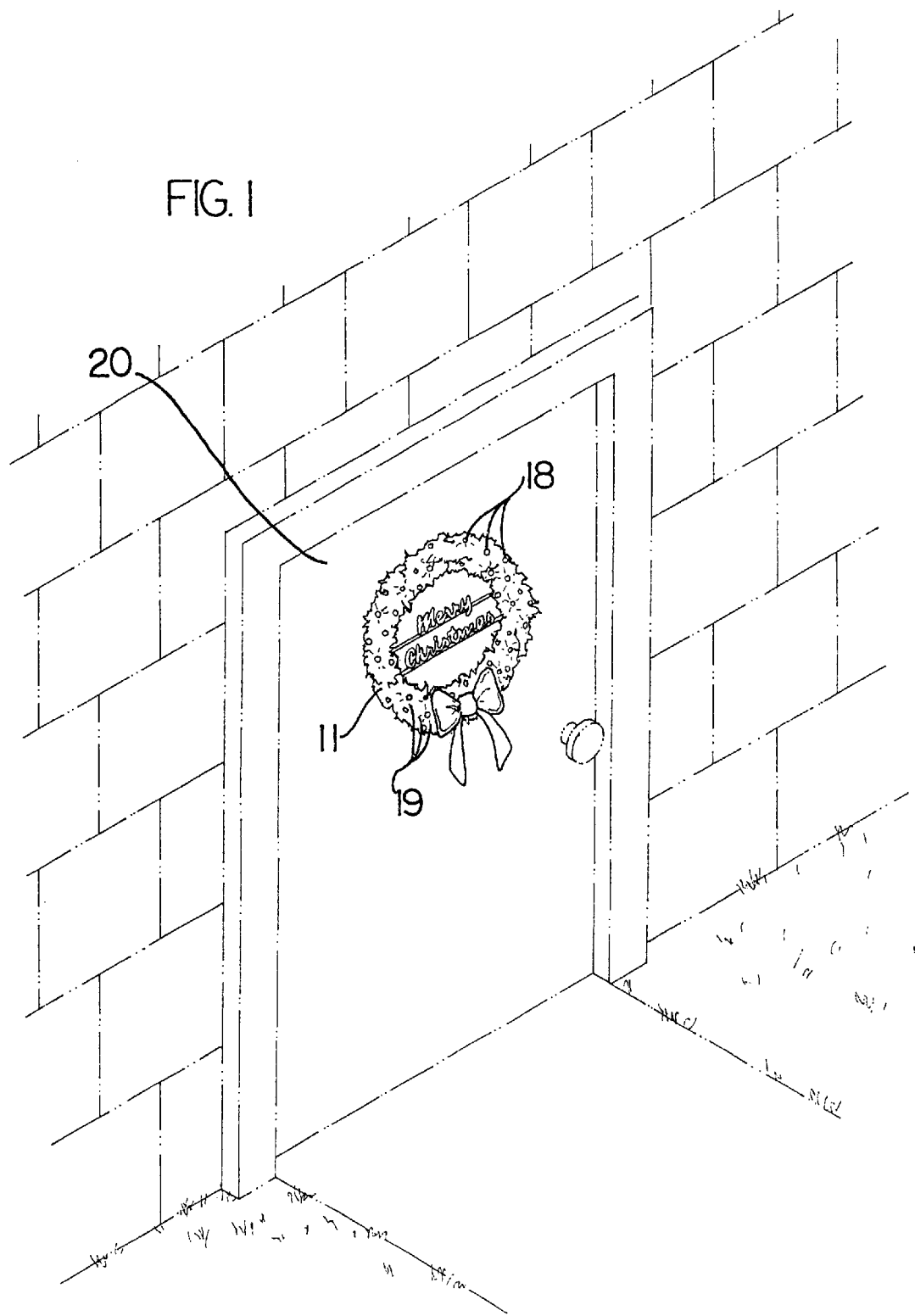
FIG. 1 is a perspective view of a new decorative holiday ornament according to the present invention and shown in use.
Figure 2:
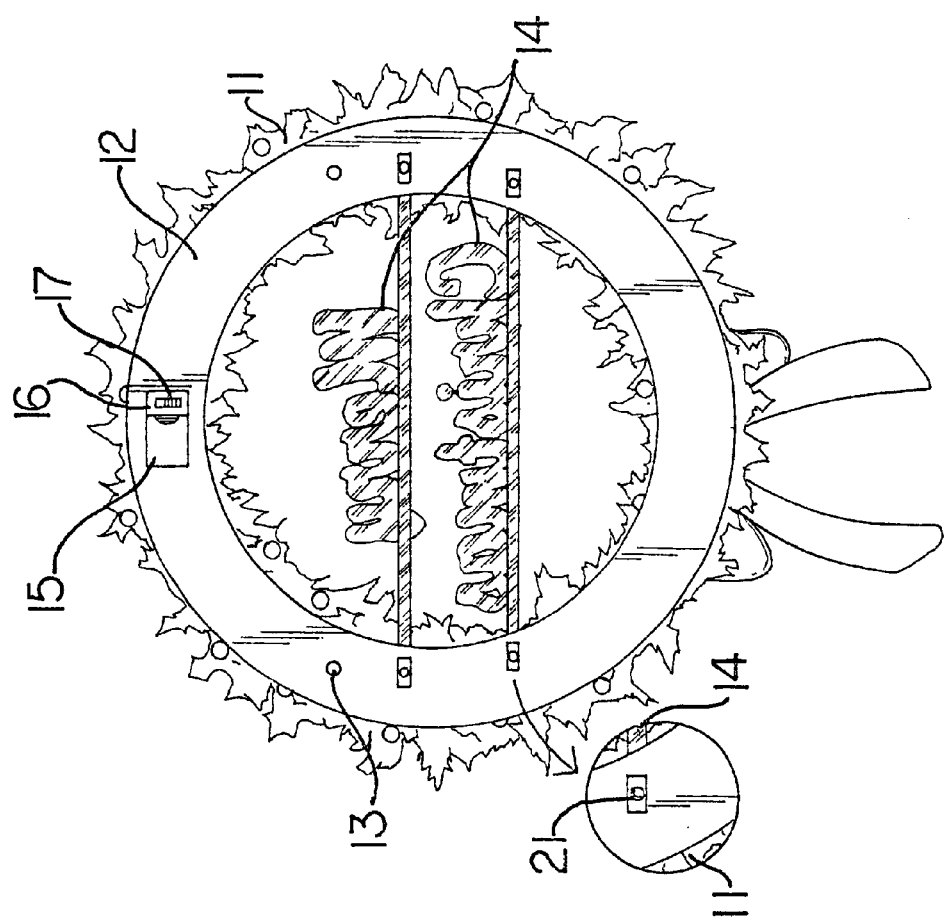
FIG. 2 is a rear elevational view of the present invention.
Figure 3:
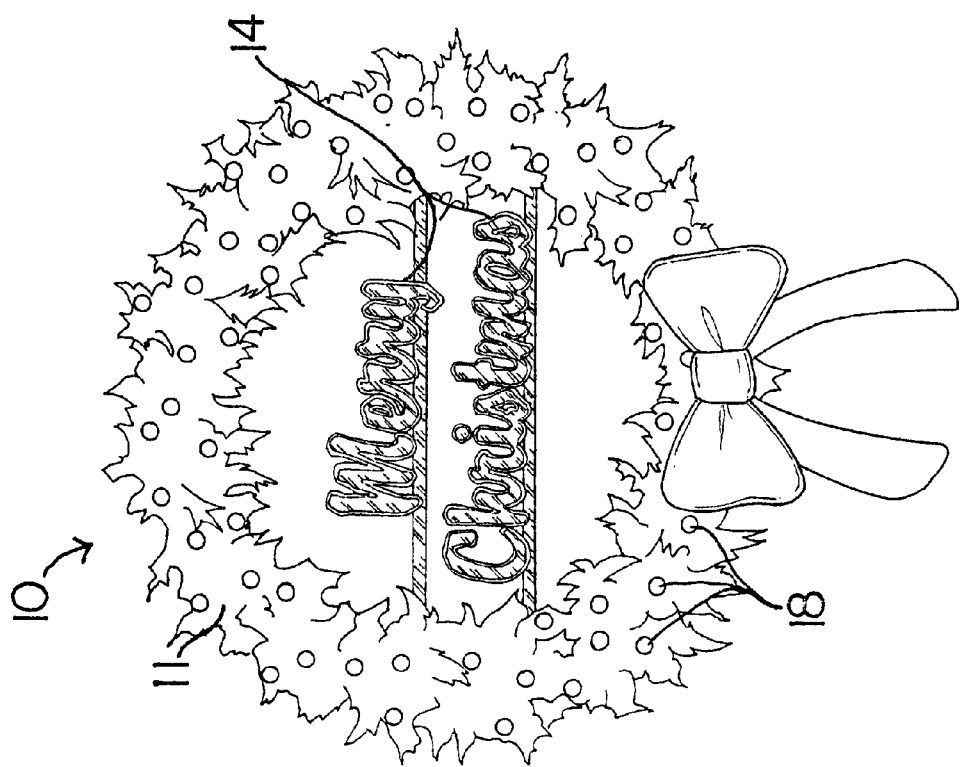
FIG. 3 is a front elevational view of the present invention.

With reference now to the drawings, and in particular to FIGS. 1 through 3 thereof, a new decorative holiday ornament embodying the principles and concepts of the present invention and generally designated by the reference numeral 10 will be described.

As best illustrated in FIGS. 1 through 3, the decorative holiday ornament 10 generally comprises a wreath 11 being adapted to be mounted upon a structure 20 with the wreath 11 being made of polyvinyl-chloride. A protective backing member 12 is securely and conventionally attached to a back of the wreath 11 to prevent the wreath 11 from scratching the structure 20. The protective backing member 12 is generally a band having a definite thickness and being made of rubber and having mounting holes 13 being disposed therethrough.

A light-emitting assembly is conventionally attached to the wreath 11 and includes a fiber optic member 14 being arranged to form lines, letters, words, and greeting messages and being displayed upon a front of the wreath 11. The light-emitting assembly also includes a battery pack 16 including a battery case 15 and being conventionally mounted to the protective backing member 12 and being conventionally connected to the fiber optic members 14, and further includes a power switch 17 being conventionally mounted to the protective backing member 12 and being conventionally connected to the fiber optic members 14 and to the battery pack 15. The light-emitting assembly also includes a plurality of light-emitting members 18 being spaced about and being conventionally disposed upon the front of the wreath 11 and also being connected with wires 19 to the battery pack 16 and to the power switch 17. The light-emitting assembly further includes fiber optic support members 21 being securely and conventionally mounted to the wreath 11. The fiber optic members 14 are conventionally attached to the fiber optic support members 21 with the fiber optic support members 21 being generally clip-like members which are capable of being clipped to the fiber optic members 14.

In use, the user turns on the power switch 17 which energizes the fiber optic members 14 and the light-emitting members 18, and then hangs the wreath 11 upon a structure 20 such as a building with the fiber optic members 14 being arranged in holiday greetings such as "Merry Christmas".

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A decorative holiday ornament comprising:
   a wreath being adapted to be mounted upon a structure;
   a protective backing member being securely attached to a back of said wreath to prevent said wreath from scratching the structure wherein said protective backing member is generally planar and circular having a definite thickens and being made of rubber and having mounting holes being disposed therethrough; and
   a light-emitting assembly being attached to said wreath and including fiber optic members being arranged to form lines, letters, words, and greeting messages and being displayed upon a front of said wreath.

2. A decorative holiday ornament as described in claim 1, wherein said wreath is made of polyvinyl-chloride.

3. A decorative holiday ornament as described in claim 1, wherein said light-emitting assembly also includes a battery pack including a battery case and being mounted to said protective backing member and being connected to said fiber optic members, and further includes a power switch being mounted to said protective backing member and being connected to said fiber optic members and to said battery pack.

4. A decorative holiday ornament as described in claim 3, wherein said light-emitting assembly also includes a plurality of light-emitting members being spaced about and being disposed upon said front of said wreath and also being connected to said battery pack and to said power switch.

5. A decorative holiday ornament as described in claim 4, wherein said light-emitting assembly further includes fiber optic support members being securely mounted to said wreath, said fiber optic members being attached to said fiber optic support members.

6. A decorative holiday ornament as described in claim 5, wherein said fiber optic support members are generally clip-like members which are capable of being clipped to said fiber optic members.

7. A decorative holiday ornament comprising:
- a wreath being adapted to be mounted upon a structure, said wreath being made of polyvinyl-chloride;
- a protective backing member being securely attached to a back of said wreath to prevent said wreath from scratching the structure, said protective backing member being generally planar and circular having a definite thickness and being made of rubber and having mounting holes being disposed therethrough; and
- a light-emitting assembly being attached to said wreath and including fiber optic members being arranged to form lines, letters, words, and greeting messages and being displayed upon a front of said wreath, said light-emitting assembly also including a battery pack including a battery case and being mounted to said protective backing member and being connected to said fiber optic members, and further including a power switch being mounted to said protective backing member and being connected to said fiber optic members and to said battery pack, said light-emitting assembly also including a plurality of light-emitting members being spaced about and being disposed upon said front of said wreath and also being connected to said battery pack and to said power switch, said light-emitting assembly further including fiber optic support members being securely mounted to said wreath, said fiber optic members being attached to said fiber optic support members, said fiber optic support members being generally clip-like members which are capable of being clipped to said fiber optic members.

* * * * *